United States Patent
Patel et al.

(10) Patent No.: US 8,503,621 B2
(45) Date of Patent: Aug. 6, 2013

(54) SECURE VOICE COMMUNICATION CHANNEL FOR CONFIDENTIAL MESSAGING

(75) Inventors: Labhesh Patel, San Francisco, CA (US); Sanjeev Kumar, San Francisco, CA (US); Mukul Jain, San Jose, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1707 days.

(21) Appl. No.: 11/366,859

(22) Filed: Mar. 2, 2006

(65) Prior Publication Data
US 2007/0206738 A1    Sep. 6, 2007

(51) Int. Cl.
*H04M 11/00*    (2006.01)
*H04M 11/10*    (2006.01)

(52) U.S. Cl.
USPC ........................................ 379/88.13; 455/413

(58) Field of Classification Search
USPC ........ 379/73, 167.14, 88.01–88.28; 455/434, 455/450, 455, 464, 8, 509, 511, 151.1, 158.1, 455/166.2
See application file for complete search history.

(56) References Cited

U.S. PATENT DOCUMENTS

| | | | |
|---|---|---|---|
| 4,805,210 A | 2/1989 | Griffith, Jr. | |
| 5,432,844 A | 7/1995 | Core et al. | |
| 5,608,786 A * | 3/1997 | Gordon | 370/352 |
| 5,615,213 A | 3/1997 | Griefer | |
| 5,794,218 A | 8/1998 | Jennings et al. | |
| 5,937,040 A | 8/1999 | Wrede et al. | |
| 5,974,142 A * | 10/1999 | Heer et al. | 380/9 |
| 5,999,599 A | 12/1999 | Shaffer et al. | |
| 6,044,081 A | 3/2000 | Bell et al. | |
| 6,259,405 B1 | 7/2001 | Stewart et al. | |
| 6,271,764 B1 | 8/2001 | Okamura | |
| 6,421,544 B1 | 7/2002 | Sawada | |
| 6,438,600 B1 | 8/2002 | Greenfield et al. | |
| 6,526,293 B1 | 2/2003 | Matsuo | |
| 6,545,596 B1 | 4/2003 | Moon | |
| 6,564,261 B1 | 5/2003 | Gudjonsson et al. | |
| 6,587,680 B1 | 7/2003 | Ala-Laurila | |
| 6,643,774 B1 | 11/2003 | McGarvey | |
| 6,654,455 B1 | 11/2003 | Isaka | |
| 6,769,000 B1 | 7/2004 | Akhtar et al. | |
| 6,792,296 B1 | 9/2004 | Van Bosch | |
| 6,792,297 B2 | 9/2004 | Cannon et al. | |
| 6,798,874 B1 | 9/2004 | Ohlinger et al. | |

(Continued)

OTHER PUBLICATIONS

How to Build Smart Appliances, Albercht Schmidt, Kristof Van Laerhoven, IEEE Personal Communications, Aug. 2001, pp. 66-71.

*Primary Examiner* — Simon Sing
*Assistant Examiner* — Solomon Bezuayehu
(74) *Attorney, Agent, or Firm* — Baker Botts L.L.P.

(57) ABSTRACT

A unified messaging system includes a unit to store a message operable to store a message sent to a user, the message having a selectable security attribute set to a one of a plurality of levels. A module associated with the unit operates to secure a voice channel used by the user to listen to the message when the selectable security level is set to a high level indicating encryption. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

12 Claims, 7 Drawing Sheets

U.S. PATENT DOCUMENTS

| | | | |
|---|---|---|---|
| 6,799,052 B2 | 9/2004 | Agness et al. | |
| 6,804,334 B1 | 10/2004 | Beasley et al. | |
| 6,816,469 B1 | 11/2004 | Kung et al. | |
| 6,839,761 B2 | 1/2005 | Kadyk et al. | |
| 6,847,715 B1 | 1/2005 | Swartz | |
| 6,870,835 B1 | 3/2005 | Chen et al. | |
| 6,876,734 B1 | 4/2005 | Summers et al. | |
| 6,905,414 B2 | 6/2005 | Danieli et al. | |
| 6,912,275 B1 | 6/2005 | Kaplan | |
| 6,917,672 B2 | 7/2005 | Brown et al. | |
| 6,918,034 B1 | 7/2005 | Sengodan et al. | |
| 6,931,001 B2 | 8/2005 | Deng | |
| 6,934,858 B2 | 8/2005 | Woodhill | |
| 6,947,417 B2 | 9/2005 | Laursen et al. | |
| 6,959,184 B1 * | 10/2005 | Byers et al. | 455/410 |
| 6,985,745 B2 | 1/2006 | Quaid | |
| 6,987,744 B2 | 1/2006 | Harrington et al. | |
| 7,333,614 B2 * | 2/2008 | Jarosinski et al. | 380/268 |
| 2002/0010008 A1 | 1/2002 | Bork et al. | |
| 2002/0068537 A1 | 6/2002 | Shim et al. | |
| 2002/0086680 A1 | 7/2002 | Hunsinger | |
| 2002/0098831 A1 * | 7/2002 | Castell et al. | 455/413 |
| 2002/0178228 A1 * | 11/2002 | Goldberg | 709/206 |
| 2002/0198004 A1 | 12/2002 | Heie et al. | |
| 2003/0061496 A1 | 3/2003 | Ananda | |
| 2004/0078334 A1 * | 4/2004 | Malcolm et al. | 705/50 |
| 2004/0121774 A1 * | 6/2004 | Rajkotia et al. | 455/441 |
| 2004/0131206 A1 | 7/2004 | Cao et al. | |
| 2004/0205330 A1 * | 10/2004 | Godfrey et al. | 713/150 |
| 2004/0248586 A1 | 12/2004 | Patel et al. | |
| 2005/0157708 A1 | 7/2005 | Chun | |
| 2005/0177622 A1 | 8/2005 | Spielman et al. | |
| 2005/0272413 A1 | 12/2005 | Bourne | |
| 2006/0034336 A1 | 2/2006 | Huh et al. | |
| 2006/0068731 A1 * | 3/2006 | Seier | 455/226.2 |
| 2006/0116175 A1 | 6/2006 | Chu | |
| 2006/0173968 A1 * | 8/2006 | Vaarala et al. | 709/214 |
| 2007/0173256 A1 * | 7/2007 | Laroia et al. | 455/436 |

* cited by examiner

SECURE VOICE COMMUNICATION CHANNEL FOR CONFIDENTIAL MESSAGING

FIELD OF THE INVENTION

The present invention relates generally to the related fields of communication, telephony, and messaging systems; more specifically, to systems and methods of operation that provide for secure data communications in an enterprise messaging environment.

BACKGROUND OF THE INVENTION

Modern enterprise communication systems often combine call processing and Internet Protocol (IP) telephony capabilities with a private branch exchange (PBX) system in a way that extends enterprise telephony features and functions to packet telephony network devices such as IP phones, media processing devices, voice-over-IP (VoIP) gateways, and multimedia applications. Typical features of such systems include unified messaging and multimedia conferencing capabilities. Additionally, the pervasive growth in voice and data networks has lead to the development of ever more sophisticated communication and messaging systems that enable users to send and retrieve voice, text, and electronic mail messages from a variety of communication devices.

A unified messaging system (UMS), such as the commercially-available Cisco® Unity integrated system, handles voice, facsimile and regular text messages as objects in a single mailbox that a user can access either with a regular email client, or by telephone. A UMS typically connects to an IP-PBX to provide automated attendant, audiotext, and voice mail services to subscribers or users. For instance, a personal computer (PC) user with multimedia capabilities can open and playback voice messages, either as speech or text. Similarly, a person may retrieve their email messages as speech from a voice-over-IP (VoIP) phone connected through an IP network, or from a traditional telephone device connected with the enterprise via a conventional public switched telephone network (PSTN). Unified messaging is thus particularly convenient for mobile business users because it allows them to reach colleagues and customers through a PC or telephone device, whichever happens to be available.

An example of a unified messaging system is found in U.S. Patent Publication No. 2005/0177622, which teaches a scalable UMS that outputs a notification delivery message according to a prescribed open protocol based, in part, on a subscriber's notification preference. U.S. Patent Publication No. 2005/0157708 teaches a system and method providing UMS services that includes a PSTN interface for a telephone network service, a VMS, a facsimile, and an IP interface for connection to a packet-based network for an Internet messaging (e.g., an email service).

As networks have grown larger and use of electronic communication devices has become ubiquitous, the risk of improper interception of data and messages containing confidential information has risen. To combat the problem of unwarranted interception or eavesdropping of confidential information, sophisticated data encryption algorithms have been utilized to encrypt data and email messages prior to transmission, thereby securing the communication channel. By way of example, U.S. Pat. No. 6,905,414 teaches a secure communication mechanism for communicating credit card or other sensitive information transmitted over a data network (e.g., Internet). Similarly, a method for enabling secure communications over a network that employs a public/private key encryption algorithm through a secure communication device is described in U.S. Patent Publication No. 2003/0061496.

In many enterprises, mail encryption schemes are commonly employed to protect confidential email messages transmitted outside of the enterprise. However, if the email recipient's messaging system is a unified messaging system, then a user may listen to his email messages over an unsecured telephone line or voice channel. For instance, a recipient may listen to an email message using his cellular telephone (i.e., cellphone) over an unsecured voice channel of a wireless cellular network service provider, thereby defeating the entire encryption scheme that was originally intended to protect the message content.

Therefore, what is needed is a system and method of operation that ensures that sensitive or confidential voicemail or email messages cannot be retrieved or heard over an unsecured or unencrypted voice channel.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A messaging/telephony system and method that provides a mechanism for ensuring that confidential messages can only be listened to over a secure voice channel is described. In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one aspect of the present invention, the message description meta-data is enhanced to include a voice channel security level (VCSL) as a basic property or attribute of the message. In one embodiment, a unified messaging system (UMS) provides the capability: (1) to specify the VCSL of a composed or sent message; and (2) to ensure that messages having a high VCSL are heard only over an encrypted (i.e., secure) voice channel. In a specific implementation, email messages that are marked or include words such as "confidential", "private", or other semantic characteristics that indicate the content is sensitive and only to be read by the recipient are automatically assigned a high VCSL. In another specific implementation, the email client provides an option to the email sender to specify the VCSL of a message that he is composing or has already composed. In the case of a voicemail message, an interactive voice response (IVR) associated with the voicemail system may provide an option to the caller who is leaving a voicemail message to specify a VCSL for the message.

In another embodiment, a system administrator may establish an enterprise-wide policy that sets the VCLS of a message according to predefined rules depending on the content of the message. For instance, a system administrator may assign a high VCLS to all email and voicemail messages sent to employees in the Human Resources department. In other cases, the content of the message may be automatically scanned for certain "hot" words or phrases (e.g., "confidential", "secret", "proprietary", "do not disclose", etc.) prior to transmission or sending. The presence of any such words or phrases automatically results in the system assigning a high VCSL to that message.

In yet another embodiment, the message recipient may establish a set of personal rules or criteria (e.g., user preferences) that determine the VCSL assigned to a particular message. For example, a user may set a rule to mark as sensitive (i.e., high VCSL) all email and voicemail messages that are sent to him by his immediate supervisor.

Figure 1:
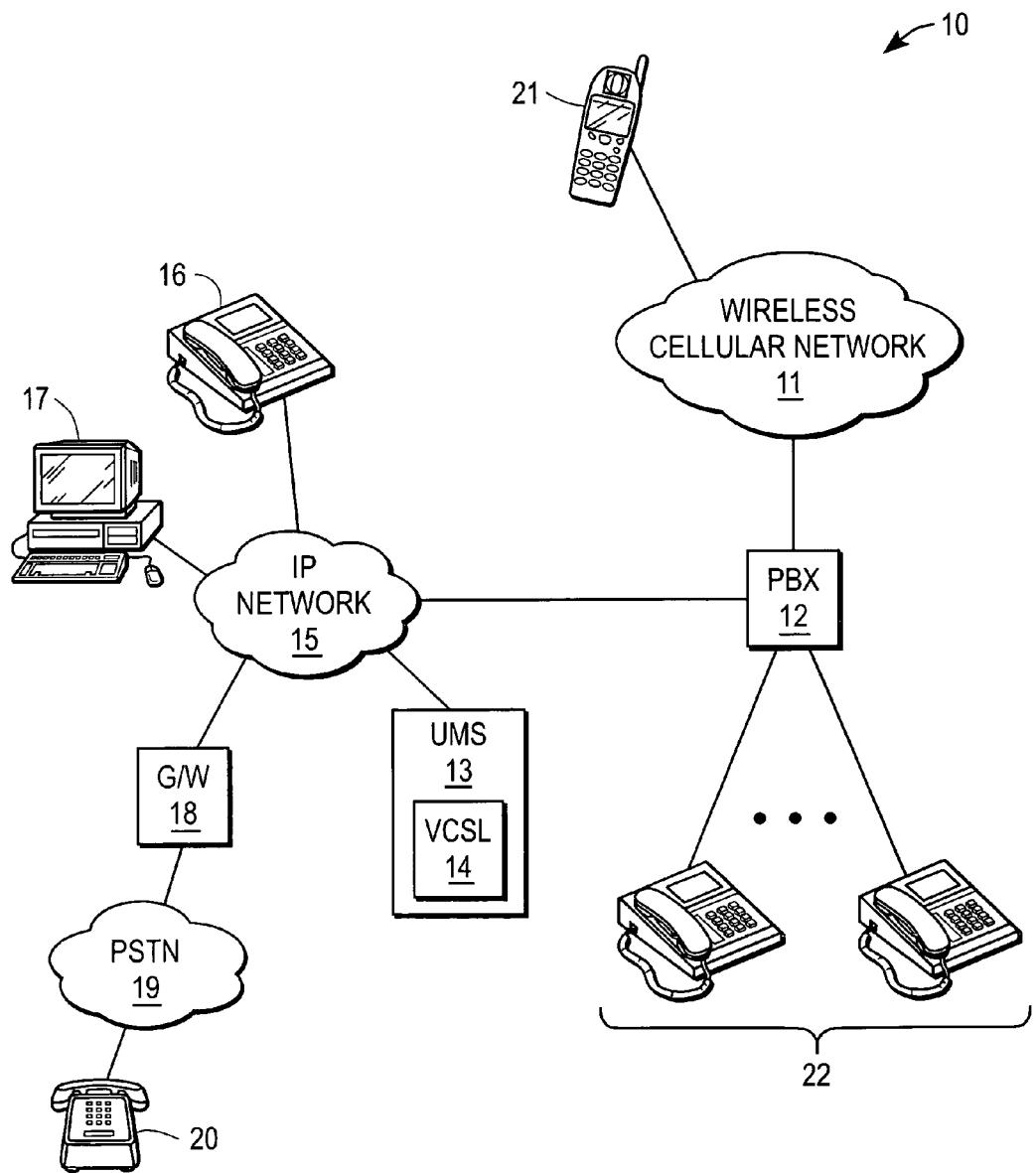
FIG. 1 is a block diagram of a communication system for confidential messaging in accordance with one embodiment of the present invention.

FIG. 1 shows an exemplary communication system 10 according to one embodiment of the present invention including an IP network 15 for connecting an assortment of different voice communication devices, including devices connected via a PBX system 12 of an enterprise, with a UMS 13. For instance, a PC 17 with built-in Softphone™ capabilities and a VoIP phone 16 may connect with UMS 13 via IP network 15. Additionally, a conventional voice-only telephone 20 may connect with UMS 13 via a path that includes PSTN 19, gateway device 18, and IP network 15. PBX 12, which may comprise either a time division multiplexing (TDM)-based or packet-network (e.g., VoIP)-based system, is shown connected to IP network 15, a plurality of standard office telephones 22 and to a cellphone 21 via a wireless cellular network 11. It is appreciated that other electronic devices, such as pagers, personal digital assistants, etc., may also be utilized to send/retrieve voicemail and email messages to/from UMS 13 through various communication channels.

Also shown in FIG. 1 is a VCSL module 14 incorporated within, or associated with, UMS 13. In one implementation, VCSL module 14 comprises a software "plug-in" that is integrated into an application program such as Cisco's Unity integrated system. In other implementations, VCSL module 14 may comprise a separate application embodied in a software module, a hardware/firmware module, or other computer product that includes executable code for performing the security steps and operations of the system described herein. UMS 13 may also include or be associated with a storage device (e.g., SRAM, EEPROM, hard disk, etc.) for storing messages and other information such as security codes, keys, etc.

Figure 2:
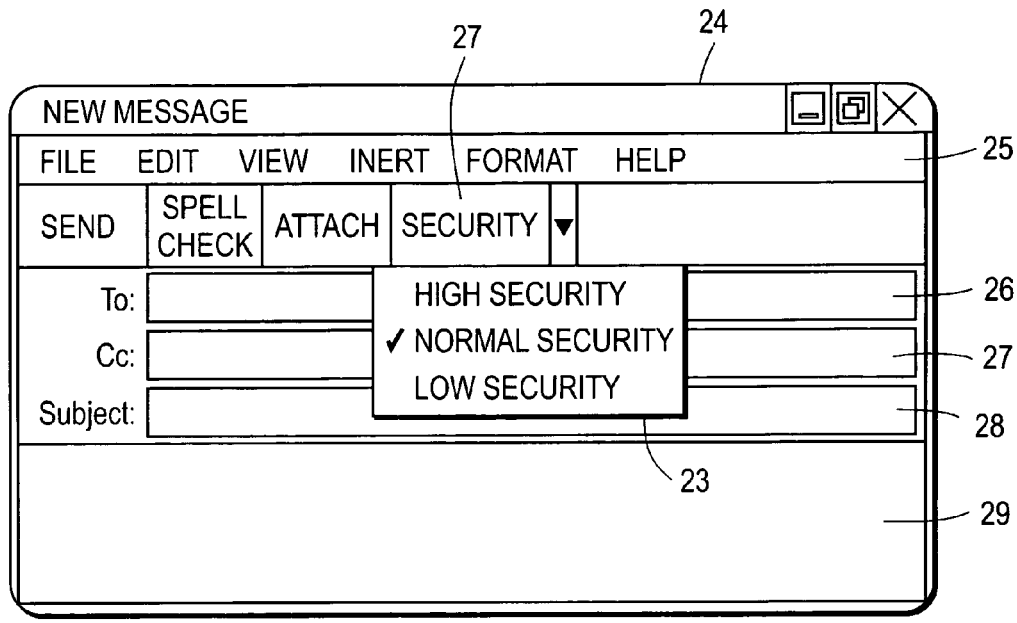
FIG. 2 illustrates a user interface window of an email client for specifying a voice channel security level in accordance with one embodiment of the present invention.

FIG. 2 illustrates a user interface window 24 of an email client running on a PC or other communication device used for composing and sending a new email message. As can be seen, window 24 includes a toolbar menu 25 that includes a security selection button 27. When the user clicks (i.e., selects) button 27 a pull-down menu 23 appears. In this particular example, menu 23 includes three different security settings: i.e., high security, normal security, and low security settings corresponding to complex encryption, normal encryption, and no encryption, respectively, of the message. Other embodiments may simply include "high security" and "low security" setting choices, respectively corresponding to encryption and no encryption of the message. In this manner, the sender may select the VCSL of the message he is composing.

Alternatively, the VCSL may be automatically set by the unified messaging system or the email client based on the content in any of the data entry fields 26-29. For example, certain names in the recipient ("addressee") fields 26 & 27 may trigger a high VCSL setting. Likewise, certain sensitive (i.e., "hot") words, phrases, or semantic characteristics in subject field 28 or message body field 29 may automatically result in the message being assigned a high VCSL, meaning that the recipient may only listen to the message over a secure voice channel.

Figure 8:
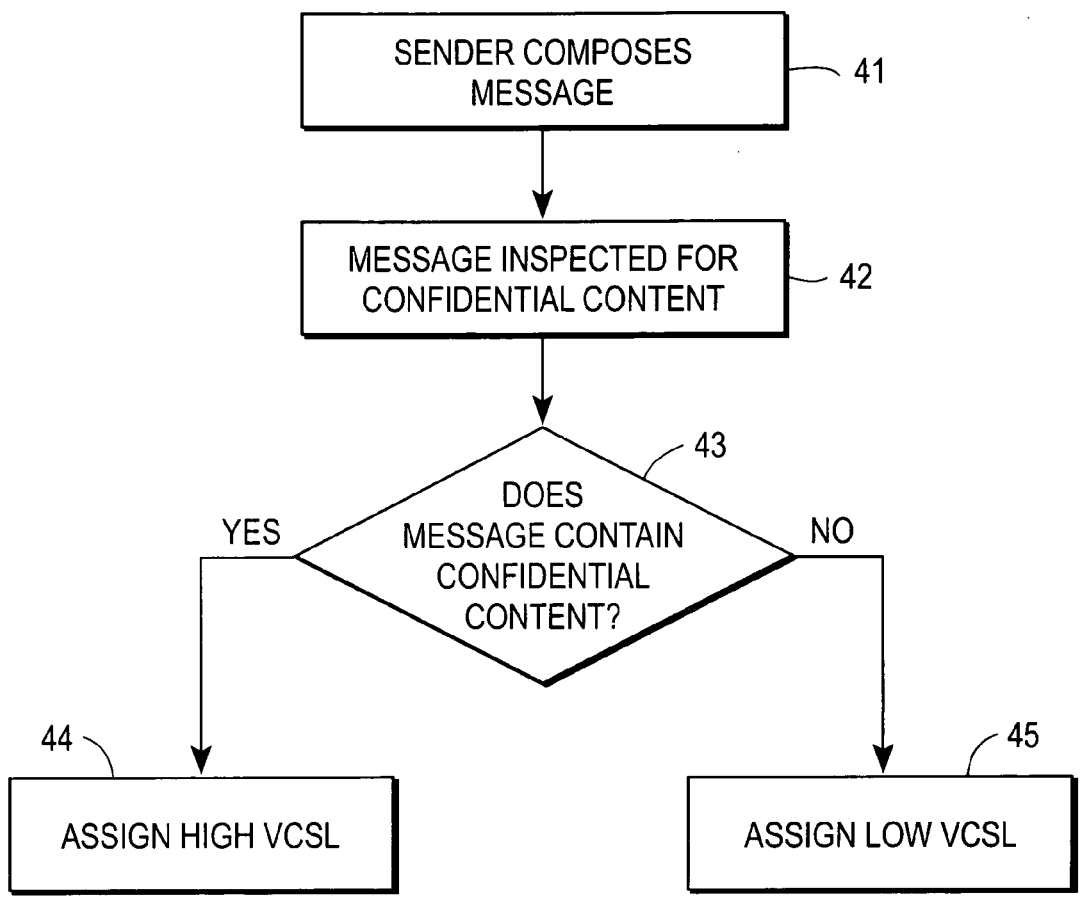
FIG. 8 is a flow chart diagram showing another method of operation according to an embodiment of the present invention.

FIG. 8 is a flow chart diagram illustrating a method for assigning the VCSL of a message by either the UMS (or email client) in accordance with one embodiment of the present invention. After the sender has composed the voicemail or email message (block 41), the message is automatically inspected for confidential content (block 42). Note that in the case of a voicemail message, the inspection process may involve converting the audible speech into text and then applying various templates or word/phrase matching algorithms. Alternatively, the voicemail message may be analyzed utilizing known speech recognition and/or natural language parsing tools. In the event that the message contains confidential content (query block 43), it is assigned a high VCSL (block 44). Conversely, a low VCSL is assigned to the message if no confidential content is detected (block 45).

It should be understood that for embodiments in which the UMS assigns the VCSL, the message inspection step shown in block 42 (and subsequent steps) may occur either before sending or after receiving the message. Additionally, although the example of FIG. 8 shows a binary decision process (i.e., high/low VCSL), it is appreciated that more than two VCSL settings are possible, corresponding to different levels of security depending on particular message content. For example, messages to certain employees (e.g., executives or high-level managers working in payroll or human resources departments) may be assigned the highest VCSL setting, whereas a normal VCSL setting may be utilized for messages containing the word "confidential" intended for recipients with a lower ranking or position within the organization.

In another embodiment, the VCSL property of a message is retained across different modalities. For example, when the UMS sends a high VCSL message (voice or text) as an email attachment to a user, the email message retains the information that the attachment contains confidential information. The enterprise messaging system may utilize this information and apply system wide policies to the handling of the message. By way of specific example, if the enterprise wide policy forbids forwarding confidential messages, then the unified messaging system will forbid forwarding of the email message (with the attachment). Alternatively, if forwarding of confidential messages is permitted (e.g., on a restricted basis), the system may require that the forwarding communication channel be secured prior to transmission.

Figure 3:
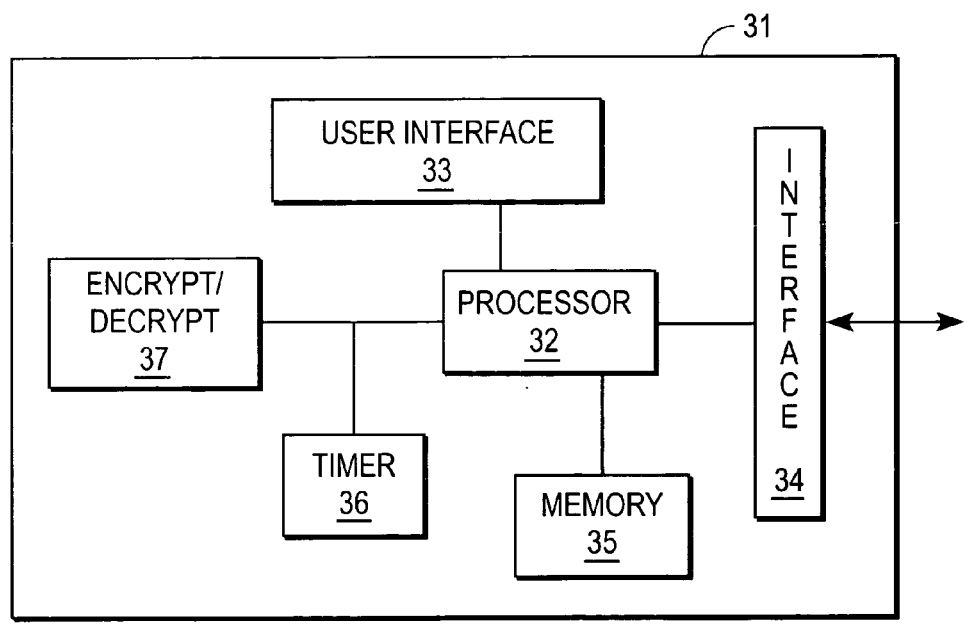
FIG. 3 is a block diagram of a security circuit utilized in a telephone device according to one embodiment of the present invention.

FIG. 3 is a block diagram of a security circuit 31 utilized in a telephone device according to one embodiment of the present invention. In the case where a message has been assigned a high VCSL (or any VCSL except one which does not require encryption) and the existing voice channel is unsecured, UMS 13 may negotiate with the user's telephone device in order to encrypt the voice channel before transmitting the message. In other words, UMS 13 and the user end device may implement one or more encryption methods in synchronization with each other (e.g., sharing the same key information) in order to protect the confidentiality of the message. It should be understood that the architecture of FIG. 3 may be applied to any communication device used for listening to voicemail or email messages stored in UMS 13.

With continued reference to FIG. 3, security circuit 31 includes a processor that interfaces with the user of the telephone device via a user interface 33, which may comprise a graphical user interface (GUI), voice user interface (VUI), or touch user interface (TUI). For example, user interface 33 may comprise a display and input devices such as keypads, touch screens, pointing devices, voice recognition systems, and the like. Processor 32 communicates with the external network (e.g., any of networks 11, 15, or 19 shown in FIG. 1) via a communication interface 34. Depending on the device configuration, interface 34 may comprise a standard wireless communication system that includes receivers, transmitters, transceivers, etc., or circuitry and devices suitable for connecting with a wired or landline network.

Security circuit 31 further includes a memory 35, a timer 36, and an encrypt/decrypt engine 37, each of which is coupled with processor 32. Engine 37 may comprise encryption algorithms, tables, and one or more processing units used for encrypting the voice channel and decrypting the received message. Encryption key information may be stored in memory 35, which may include magnetic, SRAM, or non-volatile storage systems. Timer 36 is included for synchronizing with UMS 13 and since different encryption techniques may operate based on real-time communications.

When a user dials into UMS 13 to listen to a voicemail or email message that has been accorded a high VCSL, UMS 13 first checks whether the voice channel is secure. That is, before transmitting the message to the user (caller), UMS 13 examines the voice channel to determine whether it is encrypted.

Figure 4:
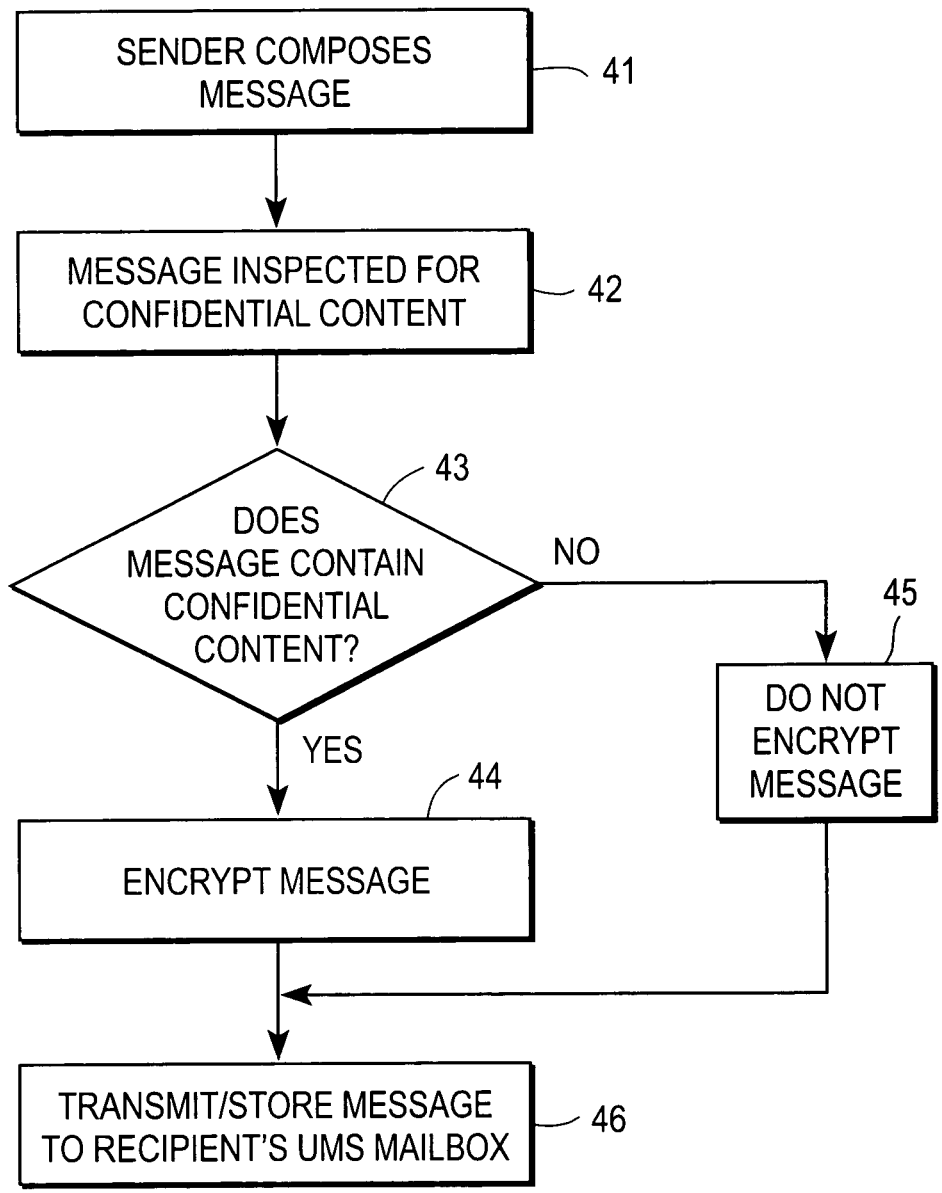
FIG. 4 is a flow chart diagram showing a method of operation in accordance with one embodiment of the present invention.

FIG. 4 is a flowchart diagram that illustrates a method of operation according to one embodiment of the present invention in which the sender and recipient each have with different unified messaging systems. The example of FIG. 4 begins after the sender has finished composing the message and has clicked on a command button to "send" the message to the recipient's remote mailbox associated with a different UMS (block 41). When the sender clicks the "send" button, the sender's UMS inspects the message (block 42) to determine whether it contains confidential or sensitive content (block 43). As previously discussed, the inspection or detection process may involve the use of template matching or speech recognition techniques to determine whether certain names, words, or phrases are present in one or more of the message data fields. In the event that the message does not contain confidential content, the message is not encrypted (block 45). That is, the message may be transmitted over an unsecured voice channel to the recipient's UMS mailbox. On the other hand, if the message does contain confidential content, the message is encrypted (block 44) before it is transmitted or otherwise stored in the recipient's UMS mailbox.

Figure 5:
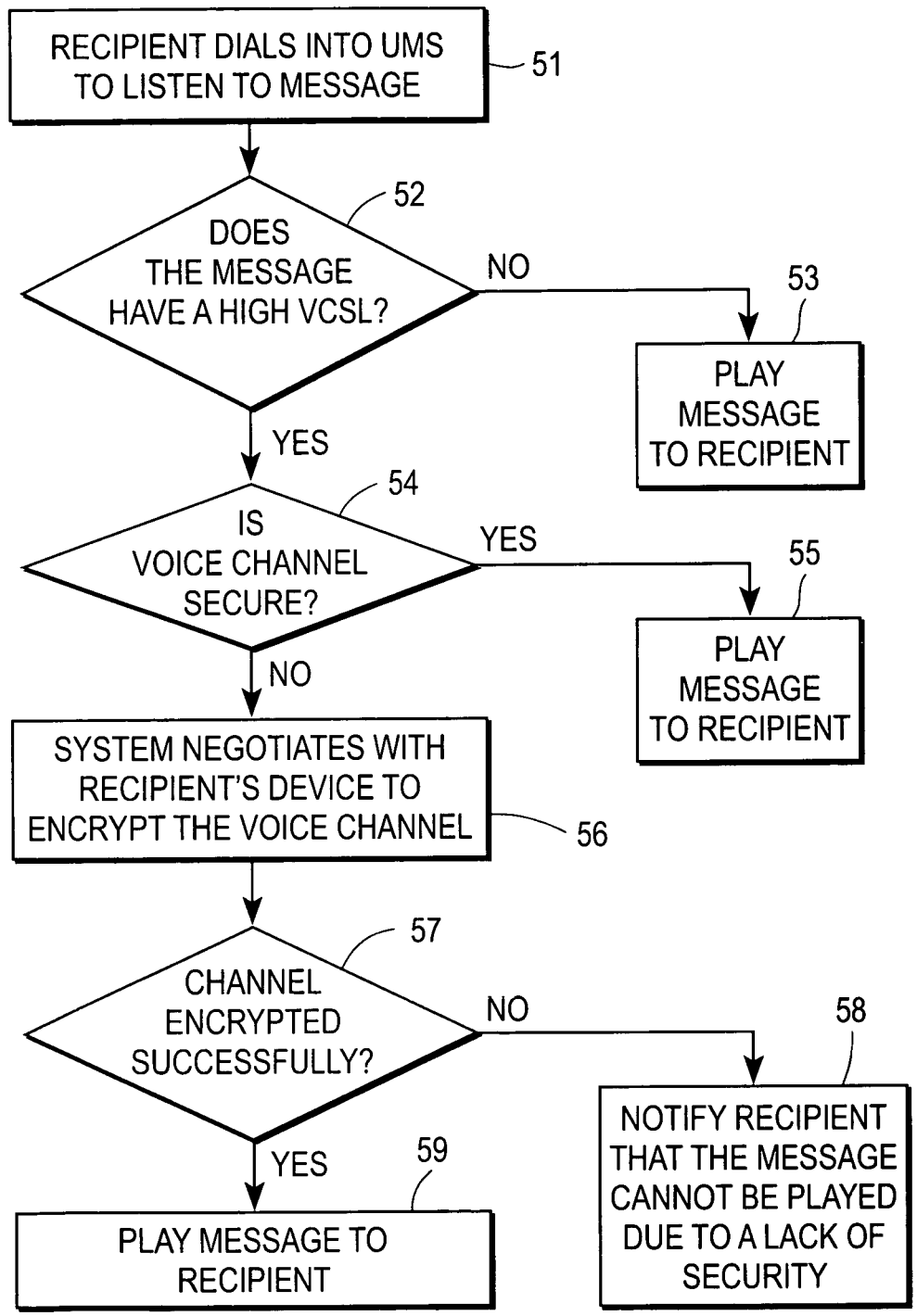
FIG. 5 is a flow chart diagram showing another method of operation according to an embodiment of the present invention.

FIG. 5 is a flowchart diagram that illustrates, in one embodiment, the operations that take place when a message recipient dials into the UMS to listen to an email or voicemail message. Once the recipient has dialed into the UMS (block 51), the system first checks whether the message has been assigned a high VCSL (block 52). If the message has been assigned a low VCSL it is simply played to the recipient over the existing voice channel (block 53). On the other hand, if the message has been assigned a high VCSL, the system checks whether the voice channel is secure (block 54). If the voice channel is secure the message is played to the recipient as usual (block 55). However, if the voice channel is not secure, then the UMS may negotiate with the recipient's telephone device in an attempt to encrypt (secure) the voice channel (block 56). If the voice channel is successfully encrypted (block 57) the message is played to the recipient (block 59). In the event that the encryption attempt is unsuccessful, the recipient may be notified that the message cannot be played due to a lack of security (block 58).

In the case where a user is listening to his messages in a sequence, then the system may be configured so as to skip high VCSL messages when the voice channel is not, or cannot be, secured. As described above, appropriate feedback, e.g., in the form of a voice recording indicating that the message cannot be played, may be provided to the listener.

Figure 6:
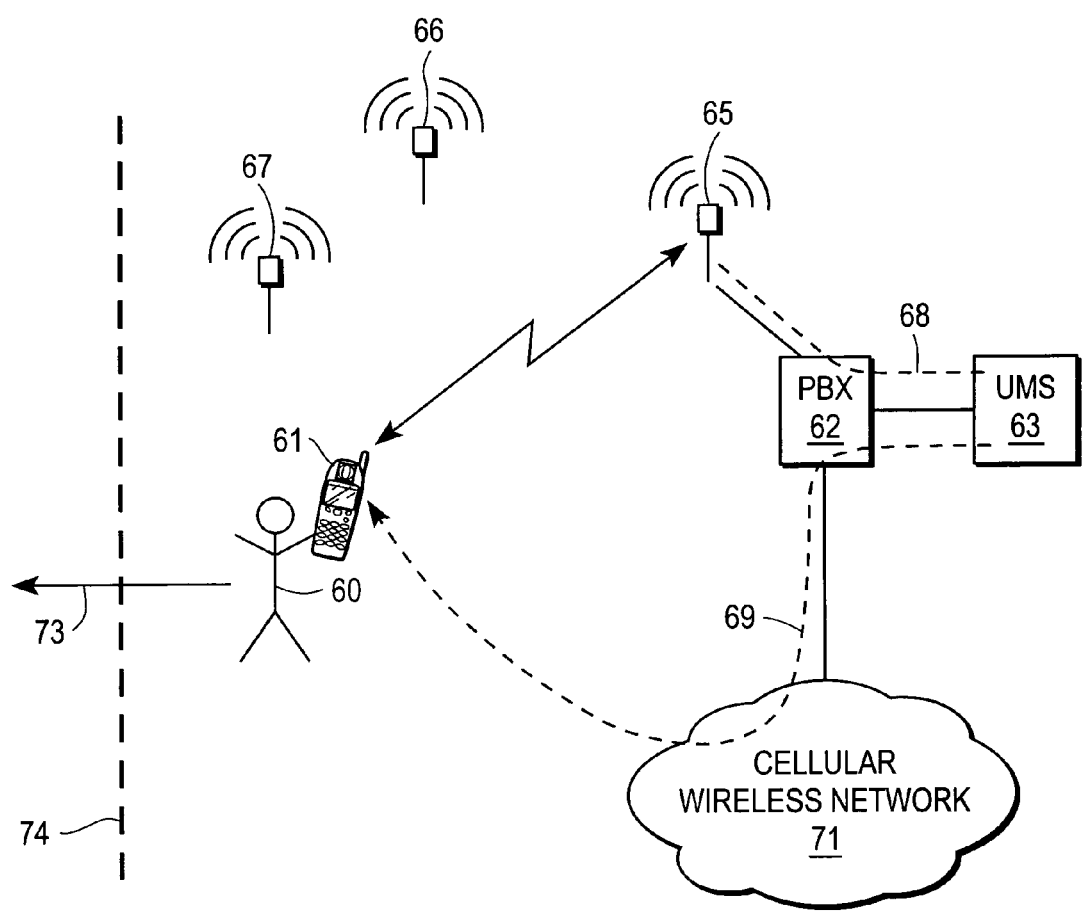
FIG. 6 is a block diagram illustrating a method of operation in accordance with another embodiment of the present invention.

FIG. 6 is a block diagram illustrating a scenario for a method of operation in accordance with another embodiment of the present invention. A user 60 is shown listening to a high VCSL message using a wireless phone 61, which is connected with UMS 63 via a secure enterprise wireless network (e.g., intranet) comprising access points 65-67. Access points 65-67 provide a communications link with UMS 63 through PBX 62. In this example, the secure communications link between access point 65 and the user's mailbox within UMS 63 is depicted by dashed line 68. User 60 is also shown moving in a direction indicated by arrow 73 toward boundary line 74. Boundary line 74 represents the wireless access point range or distance limitation beyond which secure communications are no longer possible.

Figure 7:
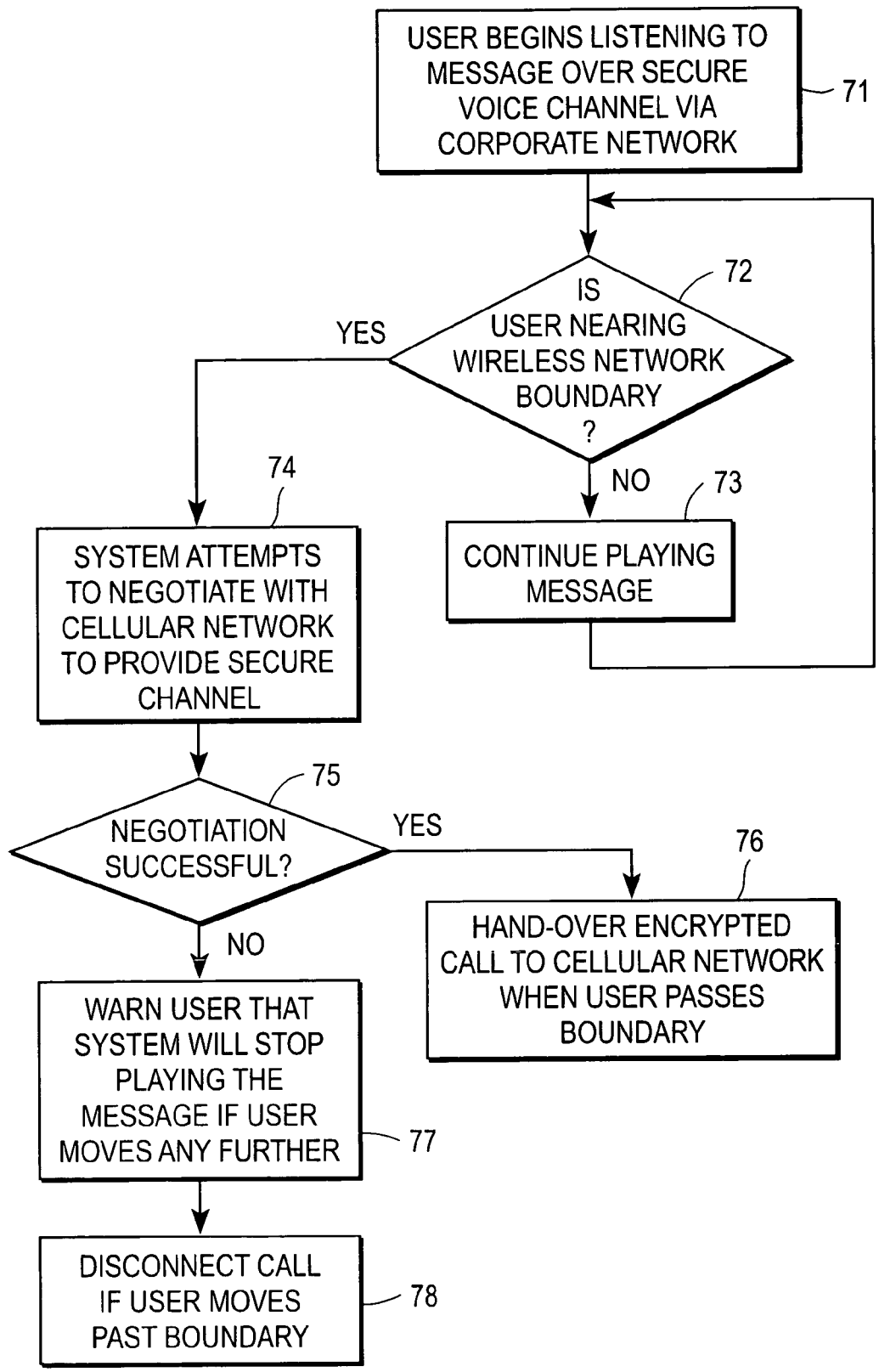
FIG. 7 is a flow chart diagram of the method shown in FIG. 6.

With continuing reference to FIG. 6, a method of operation according to another embodiment of the present invention is shown by the flow chart diagram of FIG. 7. The method begins with user 60 listening to a high VCSL message (voicemail or email) over the secure corporate wireless network (block 71). Using standard triangulation techniques, the system is able to continuously monitor the current geographic location of user 60.

Triangulation is a known process by which the location of a radio transmitter (e.g., wireless phone 61) can be determined by measuring either the radial distance, or the direction, of the received signal from two or three different points (e.g., access points 65-67). User location monitoring and triangulation calculations may be performed by one or more processors located anywhere on the corporate network or within PBX 62 or UMS 63. For example, in the scenario shown in FIG. 6, the distance to phone 61 may be determined by measuring the relative time delays in the signal from the phone to access point base stations 65-67. Directional antennas at two base stations can also be used to pinpoint the location of the phone. Other existing tracking techniques, such as GPS or IP-based location methods, may also be used. Thus, by continuously monitoring the wireless communications of phone 61, the system of FIG. 6 is able to determine when user 60 is nearing network boundary line 74 (block 72).

In the case where user 60 is well within the boundaries of the corporate environment, the user may continue to listen to the message as usual (block 73). However, if the system detects user 60 nearing transmission range limit or boundary line 74 of the secure enterprise wireless network, it may attempt to negotiate a secure communication channel with a public cellular wireless network 71 (block 74). If the negotiation is successful (block 75) the system simply hands off the encrypted call to the cellular network. In the diagram of FIG. 6, this may occur by transferring the call from communications link 68 to a secure communications link (channel) 69 that connects user 60 with UMS 63 via cellular wireless network 71.

In the event that the system is unable to secure a voice channel with cellular wireless network 71, it may optionally issue a warning to the user that it will stop playing the high VCSL message if the user moves any further away from the building or enterprise campus environment (block 77). Whether or not the system provides an advance warning, when the user crosses boundary line 74 and the system has been unsuccessful in securing a voice channel with cellular wireless network 71, the encrypted call is disconnected (block 78).

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A processor-implemented method of operation for a unified messaging system (UMS), comprising:
scanning a message for certain information, the message comprising a voice channel security level (VCSL) associated with the message and being stored for a user in the UMS;
automatically setting a security attribute to the VCSL of the message based upon detection of the certain information, the certain information including one or more words, phrases, or addresses that satisfy predefined rules;
receiving a request to listen to a message stored in the UMS, the request coming from the user connected to the UMS via a voice communication channel over a corporate network;
negotiating with a telephone device of the user to secure the voice communication channel when the security attribute is set in the VCSL;
playing the message to the user if the voice communication channel of the corporate network is secure; otherwise,
prohibiting playout of the message over the voice communication channel; and
notifying the user that the message cannot be played due to the lack of security in the event that the voice communication channel is unsecured;
determining whether the recipient is within a transmission range limit of the corporate network;
if the recipient is outside the transmission range limit, negotiating with a cellular network to provide a secure channel over which to play the message.

2. The processor-implemented method of claim 1 wherein the message comprises an email message or a voicemail message.

3. The processor-implemented method of claim 1 wherein the network comprises a cellular wireless network.

4. A processor-implemented method of operation for a unified messaging system (UMS), comprising:
automatically scanning a message for certain information according to predefined rules;
setting a security attribute to a voice channel security level (VCSL) associated with the message when the certain information is present, the certain information including one or more words, phrases, or addresses that satisfy the predefined rules;
storing the message in a mailbox of a recipient in the UMS;
receiving a request from the recipient to listen to the message over a voice communication channel of a corporate network;
encrypting the voice communication channel;
playing out the message to the recipient over the encrypted voice communication channel of the corporate network;
determining whether the recipient is within a transmission range limit of the corporate network;
if the recipient is outside the transmission range limit, negotiating with a cellular network to provide a secure channel over which to play the message.

5. The processor-implemented method of claim 4 wherein the message comprises an email message or a voicemail message.

6. A unified messaging system (UMS) for an enterprise comprising:
a unit operable to store a message sent to a user in the UMS;
a module associated with the unit, the module being operable to scan the message and automatically set a security attribute set to a voice channel security level (VCSL) associated with the message when certain information is present in the message that satisfies predefined rules, the module also being operable to secure a voice communication channel used by the user to listen to the message when the security level is set in the VCSL, thereby indicating that the message is to be encrypted, the module being further operable to block playing of the message in the event that the voice communication channel is unable to be secured, the module being further operable to play an audible message notifying the user that the message cannot be played because the voice communication channel is unsecured, and the module is further operable to:
play the message to the user if the voice communication channel of a corporate network is secure;
determine whether the recipient is within a transmission range limit of the corporate network; and
if the recipient is outside the transmission range limit, negotiate with a cellular network to provide a secure channel over which to play the message.

7. The unified messaging system of claim 6 wherein the message comprises a voicemail message.

8. The unified messaging system of claim 6 wherein the message comprises an email message.

9. The unified messaging system of claim 6 wherein the content comprises a name or address in a recipient field of the message.

10. The unified messaging system of claim 6 wherein the content comprises a certain word or phrase in a message body field of the message.

11. A non-transitory computer-readable memory encoded with a computer program, execution of the computer program operable to:
store a message in a unified messaging system (UMS) mailbox of a recipient;

analyze the message and automatically set a security attribute to a voice channel security level (VCSL) associated with of the message when the message includes content that indicates the presence of confidential information;

encrypt a voice communication channel used by the recipient to listen to the message over a network responsive to the security attribute being set in the VCSL; and play an encrypted message to the recipient as audible speech after the voice communication channel of a corporate network has been secured; otherwise, block playing of the encrypted message to the recipient in the event that the voice communication channel cannot be secured;

determine whether the recipient is within a transmission range limit of the corporate network; and if the recipient is outside the transmission range limit, negotiate with a cellular network to provide a secure channel over which to play the message.

12. The non-transitory computer-readable memory of claim 11 wherein the encrypted message comprises either a voicemail or email message.

* * * * *